US006253873B1

(12) United States Patent
Norres et al.

(10) Patent No.: US 6,253,873 B1
(45) **Date of Patent: *Jul. 3, 2001**

(54) GAS GUIDE ELEMENT WITH SOUND-ABSORBENT WALLS FOR BLOCKING AND DAMPING NOISE SPREADING FROM IT INTO MAIN CONDUITS

(76) Inventors: Richard Norres; Albert Norres, both of Wieland Strasse 2, D-45896 Gelsenkirchen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/075,895

(22) Filed: May 11, 1998

Related U.S. Application Data

(63) Continuation-in-part of application No. 08/576,077, filed on Dec. 21, 1995, now abandoned.

(30) Foreign Application Priority Data

Dec. 21, 1994 (DE) ..................................... 44 45 794

(51) Int. Cl.[7] ............................ E04F 17/04; F01N 1/12
(52) U.S. Cl. ...................................... 181/224; 181/279
(58) Field of Search ............................ 181/224, 252, 181/256, 279, 280

(56) References Cited

U.S. PATENT DOCUMENTS

| | | | | |
|---|---|---|---|---|
| 978,287 | * | 12/1910 | Grewe | 181/280 |
| 3,113,635 | * | 12/1963 | Allen et al. | 181/268 |
| 3,244,254 | * | 4/1966 | Compo | 181/252 |
| 3,903,928 | * | 9/1975 | Sykes | 181/256 |
| 5,092,122 | * | 3/1992 | Bainbridge | 181/252 |
| 5,274,201 | * | 12/1993 | Steele | 181/224 |
| 5,548,093 | * | 8/1996 | Sato et al. | 181/224 |
| 5,731,557 | * | 3/1998 | Norres et al. | 181/233 |

FOREIGN PATENT DOCUMENTS

0346551B1 * 9/1992 (EP) .

* cited by examiner

*Primary Examiner*—David M. Gray
(74) *Attorney, Agent, or Firm*—Michael J. Striker

(57) ABSTRACT

A gas guide element with sound absorbent walls for blocking or damping noise spreading into main conduits, the gas guide element comprising a guide element body including a flexible sound absorbent inner hose resistant to mechanical, chemical and caloric load exerted by a gas to be guided; an outer hose; and a soft and flexible sound absorbent intermediate layer of material disposed between said sound absorbent inner and outer hose, said inner hose being composed of a flexible material and having an outer side provided with weighted metal elements, said sound absorbent intermediate layer being composed of a randomly oriented pile of materials, and said guide element body having a gas inlet and a gas outlet and at least one 360° convolution between said gas inlet and said gas outlet.

19 Claims, 4 Drawing Sheets

6 5 8a W 8 3 7 15 2 1

GAS GUIDE ELEMENT WITH SOUND-ABSORBENT WALLS FOR BLOCKING AND DAMPING NOISE SPREADING FROM IT INTO MAIN CONDUITS

CROSS-REFERENCE TO A RELATED APPLICATION

This application is a continuation-in-part of application Ser. No. 08/576,077, filed on Dec. 21, 1995 now abandoned.

BACKGROUND OF THE INVENTION

The invention relates to a gas guide element with sound-absorbent walls for blocking and damping noise spreading from it into main conduits, which element is made up of a flexible inner hose with a metal element, an outer hose, and a soft and likewise flexible intermediate layer of material disposed between the hose.

In a known gas guide element of this kind according to German Patent Publication DE-OS 27 49 665, the inner hose is comprised of a wide-mesh cloth which is provided on its inner side with a spiral wire as a metal element to reinforce it. The outer hose is constituted by a foil, wherein a foamed material is inserted between this foil and the cloth as a intermediate layer of material. The annular end regions of this gas guide element, which is embodied as flexible and linear as well, are closed by glued-on end caps. According to the ideas of the inventor of this gas guide element, the sound is meant to penetrate the mesh of the cloth of the inner hose, into the intermediate layer of material, which is comprised of a foamed material body, and be damped there. Because of the foamed material body, gas guide elements of this kind are neither temperature- nor abrasion-resistant and for this reason are only partially suited for sound blocking and damping. This kind of gas guide elements does not come into consideration for blocking or damping sound emissions of high sound intensity in hot gasses from gas turbines.

In another gas guide element according to German Patent Publication DE 38 30 346 C2, the inner hose, is embodied of a base element, which is both flexible and perforated, on whose exterior an open-pored foam of polymer material is deposited as a sound blocking material, which is encompassed on its outer circumference face by a compact skin as an outer hose. This gas guide element also does not come into consideration for guiding hot gasses and for damping sound intensities connected with them which occur in gas turbines. Also, the relative reductions of the sound pressure level mentioned in these prior publications allow the conclusion that there is only mediocre sound damping, although considered in the absolute, a reduction of the sound pressure level by 3 dB(A) already signifies a reduction of the sound intensity by half.

Furthermore, German Patent Publication DE 32 20 023 C3 and the identical European Patent Publication EP 0 095 582 disclose a gas guide element whose outer layer is comprised of a mainly closed-celled, elastic, thermoplastic foamed material, whereas its inner layer, which is predominantly intended to take on the task of sound blocking, is embodied of an open-celled, soft foamed material, for example a polyurethane soft foam. The two layers are connected either by means of flame lamination or a bonding agent. An intermediate layer of material between the layers in the form of a reinforcing layer is also considered, for example a random fiber structure, cloth or knit cloth of textile and/or glass fibers. This gas guide element also is considered as a sound damper for hot gasses because of its material compositions.

In gas turbines or air driver pumps to be serviced in large-capacity airplanes, for example in those of Boeing aircraft of the type 747; a sound intensity at the turbine exit of 150 dB(A) and a gas temperature of approximately 200° C. must be expected, and at the main turbines, a sound intensity of 165 dB(A) and a core jet temperature of 820° C. must be expected. This kind of sound intensity signifies a threat to human life. The graphs of this prior publication also disclose little regarding the sound intensity reduction in this range.

And finally, U.S. Pat. No. 3,374,856 discloses a gas guide element of another generic type, which is comprised of a corrugated outer hose of rubber-impregnated or plastic-impregnated woven cloth, while the inner hose is made of a synthetic plastic, e.g. urethane caoutchouc. There is no layer of material as an intermediate covering. FIG. 2 of this patent document shows a bend of a gas guide element of this kind by 180° in order to verify its flexibility. In this prior publication, though, an installation position in this bent form is not even mentioned once in passing. Also, this gas guide element is not suited to blocking or damping sound intensities in hot gasses from gas turbines because of its temperature-sensitive materials.

In addition to these gas guide elements with sound-absorbent walls, there are also a number of sound dampers with nonabsorbing walls, for example according to U.S. Pat. Nos. 2,886,121, 3,187,835, 3,415,337, 3,227,240, European Patent Publications EP 0 346 551 B1, EP 0.493 161 A1, and German Patent Publication DE-OS 2 264 354, which are not the subject of the instant invention.

SUMMARY OF THE INVENTION

Based on this prior art, the object of the invention is to embody a gas guide element with sound-absorbing walls, according to the generic type mentioned at the beginning, which is inexpensive to manufacture and easy to use, in such a way that it assures a considerable reduction of the sound intensity of noises, even in hot and chemically aggressive gasses.

This object is attained in connection with the species mentioned at the beginning in such a way that depending upon the mechanical, chemical, or caloric load exerted by the gas to e guided, the inner hose is comprised of a textile material, a woven cloth made of metal wire, glass fiber, synthetic, natural or ceramic, a nonwoven, or a soft, thin foil of polyurethane, polyamide, polytetrafluoroethylene, or a combination of these materials, which is connected on its outside to weighted metal elements, that the intermediate layer of material is made of a randomly oriented pile of mineral fibers and/or metal fibers And/or shavings and/or chips of entropy-elastic materials and the gas guide element has at least one 360° convolution between its gas inlet and its gas outlet.

The materials from textile to nonwoven in the above list can be uncoated or, for the desired gas- and airtightness, can be coated with an entropy-elastic material, such as natural caoutchouc, rubber, or a plastic, or can be provided with a thin aluminum coating of from 25$\mu$ to 50$\mu$, for example.

According to a first embodiment, the weighted metal elements are comprised of individual rings, which enclose the inner hose or hold together the inner hose, which is comprised of tube sections.

According to a second embodiment, the weighted metal elements are comprised of a metal spiral, which holds together the hose on its overlapping lateral ends and is comprised of two spiral-shaped material strips.

According to a third embodiment, the weighted metal elements are comprised of metal pieces which are fastened to the outside of the inner hose in a regular fashion. These heavy metal pieces can be connected with concrete or other heavy, parts, such as ceramic or metal-containing plastic.

According to a fourth embodiment, the weighted metal elements are comprised of a metal spiral which encloses the inner hose and of a pipe or hose which in turn encloses this metal spiral, is provided with the same convolution form, and is connected to the metal spiral by clamps or clipped-in bands, wherein the intermediate space between the inner wall of the pipe or hose and the outer wall of the hose covering is filled with water, high temperature oil, or a melting metal alloy. The correspondingly wound pipe or hose is intended on the one hand to increase the oscillated mass and on the other hand to draw off or supply thermal quantities at the same time via the filling of the intermediate space with different media, for example for cooling or also for heat recovery.

In the attainment according to the invention, the term “convolution” is in no way intended to mean only a “circular convolution”. Thus the convolution on the one hand can be embodied as a circular, archimedean, hyperbolic, or logarithmic spiral or, on the other hand, can be comprised of an elliptical or oval loop up to a knotted convolution, and finally can also have the shape of a serpentine, in particular the shape of a sinusoidal serpentine. Within the concept of the invention, a “convolution” is generally intended to be understood as the kind which extends from a geometric center point out to the intersecting region of its ends through all four quadrants of an imaginary Cartesian coordinate system. An exception to this is constituted simply by the serpentine which extends through only two quadrants.

It is advantageous to provide the gas guide element with three convolutions between its gas inlet and its gas outlet.

According to a particularly advantageous improvement of the invention, each convolution of the gas guide element is provided with as narrow a convolution radius as possible, depending on the flexibility of the materials of the hose.

The first trials with a gas guide element embodied in this way with only one circular spiral convolution of 360° of the gas guide element at a sound intensity of 150 dB(A) at the gas inlet resulted in a sound intensity reduction to 108 dB(A) at the gas outlet. When there were three circular spiral convolutions of the gas guide element and a noise intensity of 150 dB(A) at the gas inlet, only 89 dB (A) were measured at the gas outlet. According to observations made here, this kind of surprisingly strong reduction of sound intensity is not possible with any conventional and known gas guide elements. This advantageous effect can only be explained by the particular construction of the gas guide element as well as by a settling of the heavy, weighted metal elements, in particular the metal rings or the metal spiral, into the flexible intermediate layer of material, by means of which the previously demonstrated sound intensity reduction was permitted to be achieved in a surprising manner mainly by sound-absorbent and probably less by reflection and interference phenomena.

According to an advantageous improvement of the invention, the outer hose is also provided with the same construction as the inner hose, wherein the intermediate layer of material is evenly distributed in the intermediate space between the inner hose, and the outer hose.

The outer hose, is advantageously comprised of a gastight and airtight plastic such as polytetrafluoroethylene (PTFE), polyamide (PA), polyester (PETP), or a textile which is coated on one or both sides with these plastics and is made of a wire, glass fiber, synthetic, or natural cloth, of nonwoven, of ceramic, or a combination of these materials.

According to a particularly advantageous improvement of the invention, an intermediate hose, is inserted between the inner hose and the outer hose, which intermediate hose can have the same construction as the inner hose. In a particularly advantageous manner, the inner hose, is made of a stainless steel wire cloth, the intermediate and outer hose, are made of a glass fiber reinforced cloth, and the intermediate layer of material between the inner and intermediate hose, is made of stainless steel wool and the intermediate layer of material between the intermediate and outer hose is made of mineral fiber wool. A gas guide element embodied in this manner is particularly suited for blocking and damping sound of hot gasses of 1150° C. and more.

Advantageously, the hose are made in a known manner of spiral-shaped material strips whose overlapping lateral ends enclose a metallic support body and are enclosed along with this by a clamping body with a C-shaped cross section whose legs, which are disposed opposite each other at the opening point, clamp the material strips and their overlapping lateral ends at this point. This kind of hose is described in every detail and in several variants in German Patent Publication DE 37 20 231 A1. By inserting the metallic support body into the metallic clamping body with C-shaped cross section, not only is a long-lasting connection achieved between the sound absorbent walls and the metal elements, but also the latter ate weighted with a considerable mass, which expedites sound blocking.

For a further sound blocking and damping as well as for a cooling of the materials, it is particularly advantageous if in an improvement of the invention the inner hose is provided with a spray device for injecting water into the gas guide conduit.

To reduce pressure losses, the cross-sectional face of the gas guide conduit of the inner hose—and therefore of all other hose enclosing it—is enlarged in relation to the cross-sectional face of the gas guide conduit upstream of the gas inlet.

Other exemplary embodiments of the invention are shown in the drawings.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
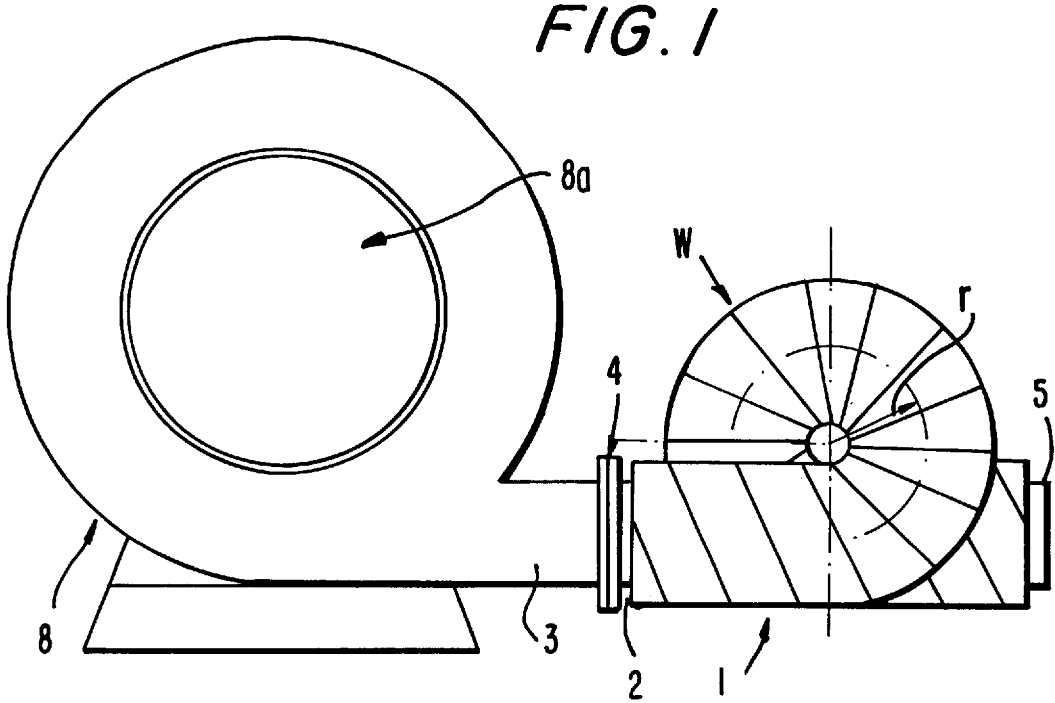
FIG. 1 shows a lateral view of a gas guide element according to the invention with only one convolution of 360°, which is flange-mounted with its gas inlet to the gas outlet of a gas turbine.

According to FIG. 1, the gas inlet 2 of the gas guide element 1 of the invention is connected via a flange connection 4 to a main conduit 3, while its-gas outlet 5 is oriented toward the atmosphere.

Figure 2:
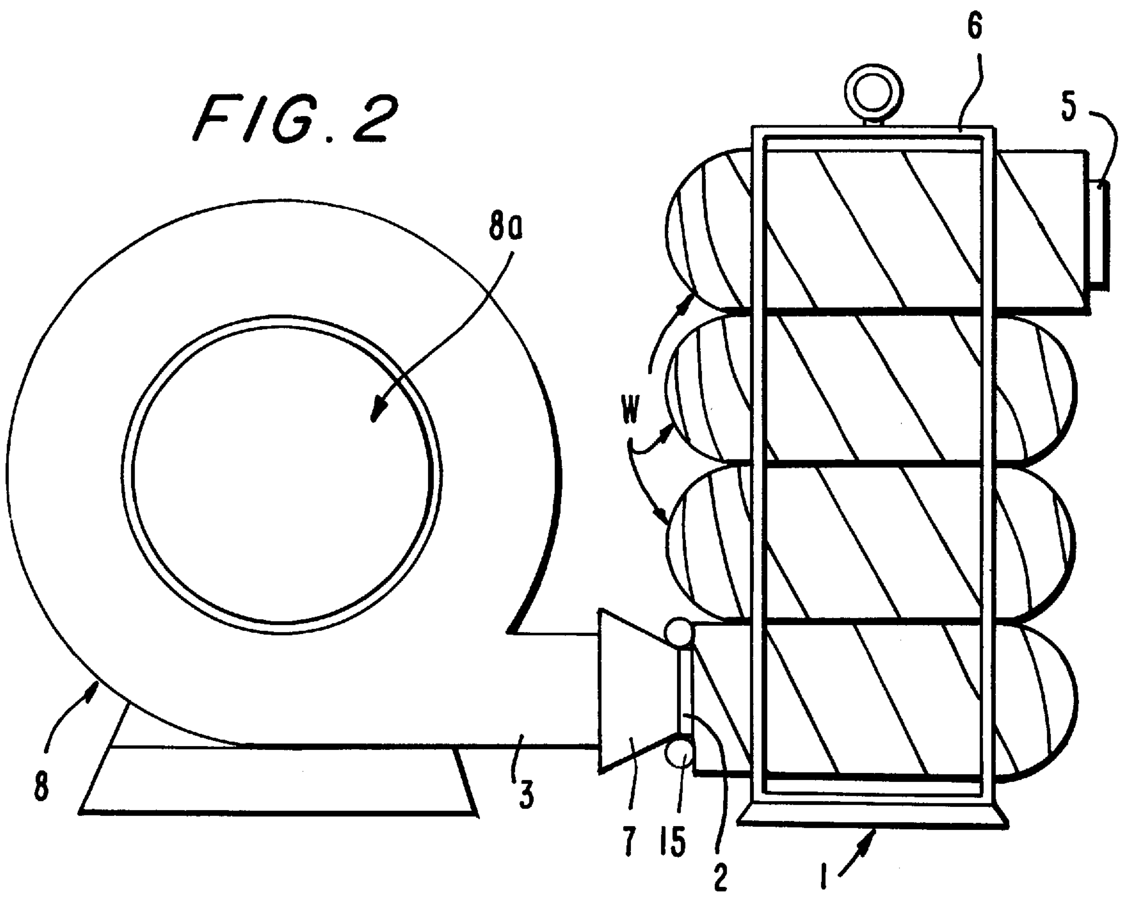
FIG. 2 shows a view of a gas guide element with three convolutions on a hoisting device, which is provided with a funnel on its gas inlet for receiving sound intensity-encumbered gasses from a turbine.

According to FIG. 1, the gas guide element 1 is provided with one convolution W having the narrowest possible convolution radius r, whereas the gas guide element 1 according to FIG. 2 has three convolutions W in all. In FIGS. 2 to 5, parts which coincide with parts in FIG. 1 are given the same reference numerals.

The gas guide element 1 according to FIG. 2 is disposed in a carrier 6 and can be arbitrarily moved along with this by a hoisting device, not shown. This hoisting device can be either a crane or a stacker truck. Its gas inlet 2 is provided with a funnel 7 into which the main conduit 3 of a symbolically depicted turbine 8 flows. However, a blower or another sound emitting machine can take the place of the turbine 8.

Figure 3:
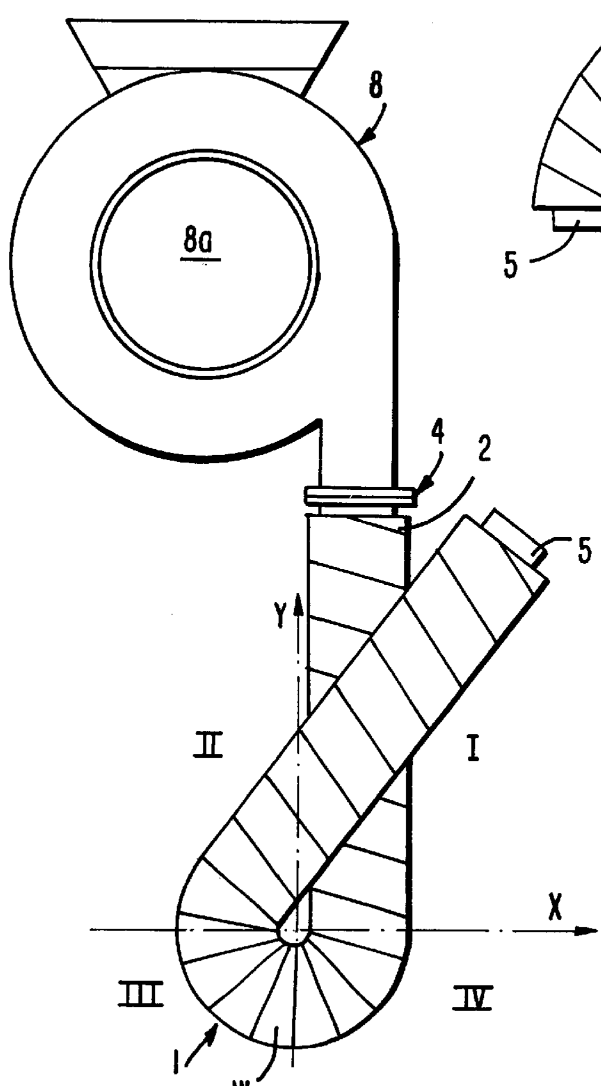
FIG. 3 shows a view of a gas guide element in the shape of a loop, which is flange-mounted with its gas inlet to the outlet of a turbine.

According to FIG. 3, the gas guide element 1 is embodied in the shape of a loop, which likewise has a convolution W of 360°, because it extends through all four quadrants of a Cartesian coordinate system, which is indicated with the abscissa axis x, the ordinate axis y, and the Roman numerals I to IV. Based on this definition, the loop according to FIG. 3 can also have other shapes.

Figure 4:
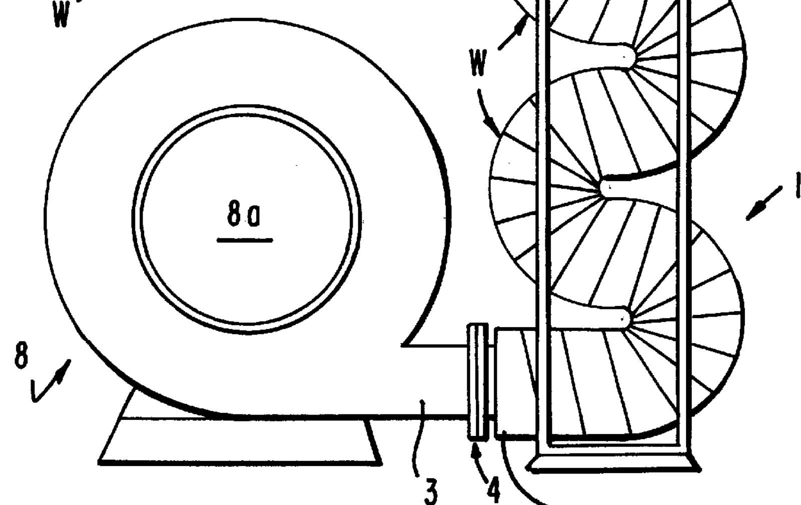
FIG. 4 shows a view of a gas guide element in the form of a sine-shaped serpentine with two convolutions, which adjoins a turbine with its gas inlet and is disposed over its entire height in a movable holder.

FIG. 4 shows a gas guide element 1 in the form of two sinusoidal serpentines of 360° each.

Figure 5:
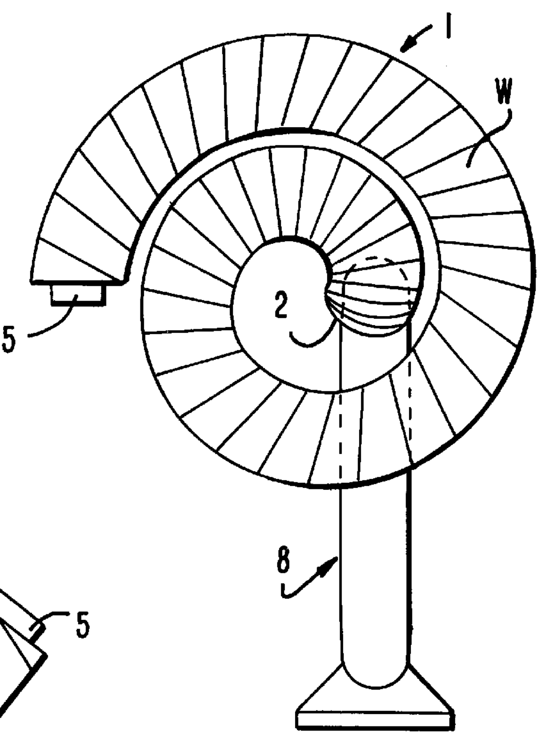
FIG. 5 shows a view of a gas guide element in the form of a spiral with one convolution, which is flange-mounted with its gas inlet to the outlet of a turbine.

In FIG. 5, the gas guide element 1 has the shape of a spiral, which can be an archimedean, hyperbolic, or logarithmic spiral.

It is evident from all the embodiments of FIGS. 1 to 5 that the convolution radius or curve radius r of the convolutions W is embodied as being as narrow or small as possible. It could be determined in experiments that the reduction of sound intensity is greater the smaller the convolution radius r is. Making a convolution radius which is as narrow as possible is limited only by the flexibility of the materials of the hose 9, 11, 14.

Figure 6:
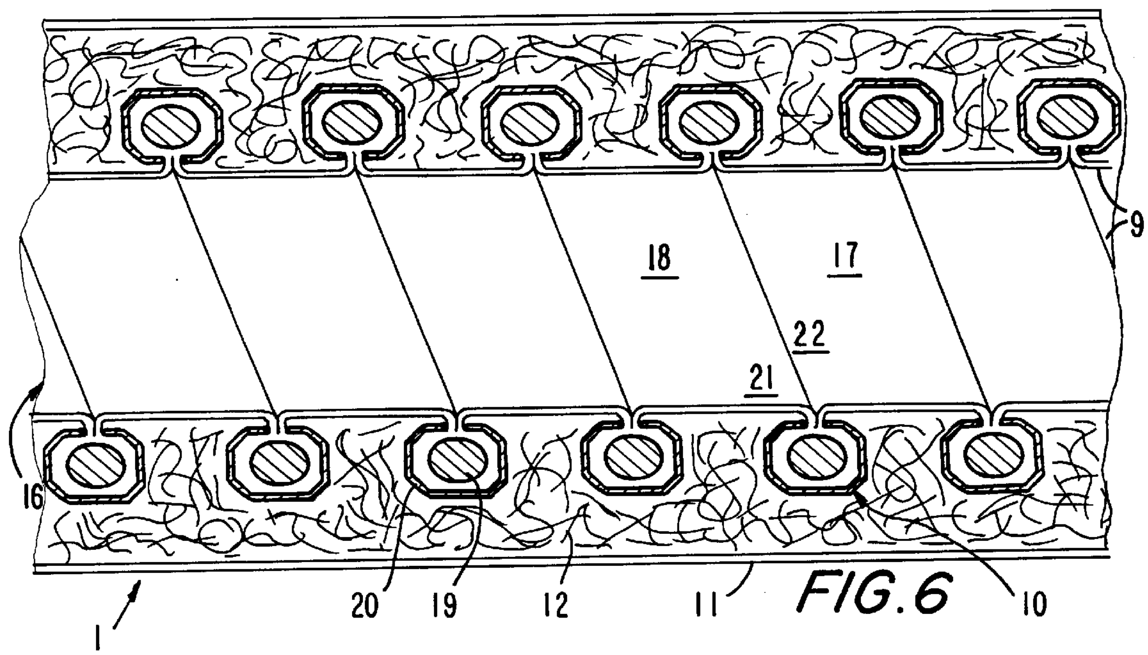
FIG. 6 shows a partial longitudinal section through a gas guide element with an outer hose which is embodied as smooth, an intermediate layer of material, and an inner hose which is comprised of two spiral-shaped material strips, which are held together with a metallic support body and a spiral-shaped clamping body with a C-shaped cross section.
Figure 7:
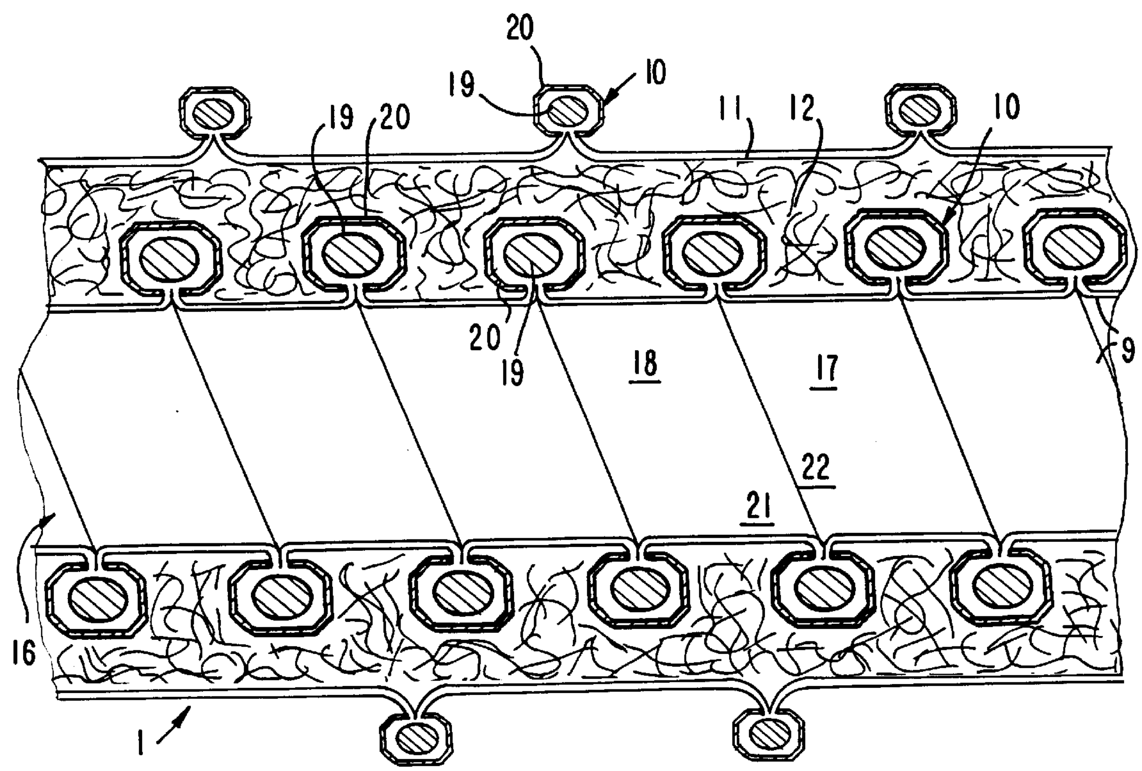
FIG. 7 shows a partial longitudinal section through another embodiment of a gas guide element with the same construction in principle of the inner and outer hose with an intermediate layer of material disposed between them.
Figure 8:
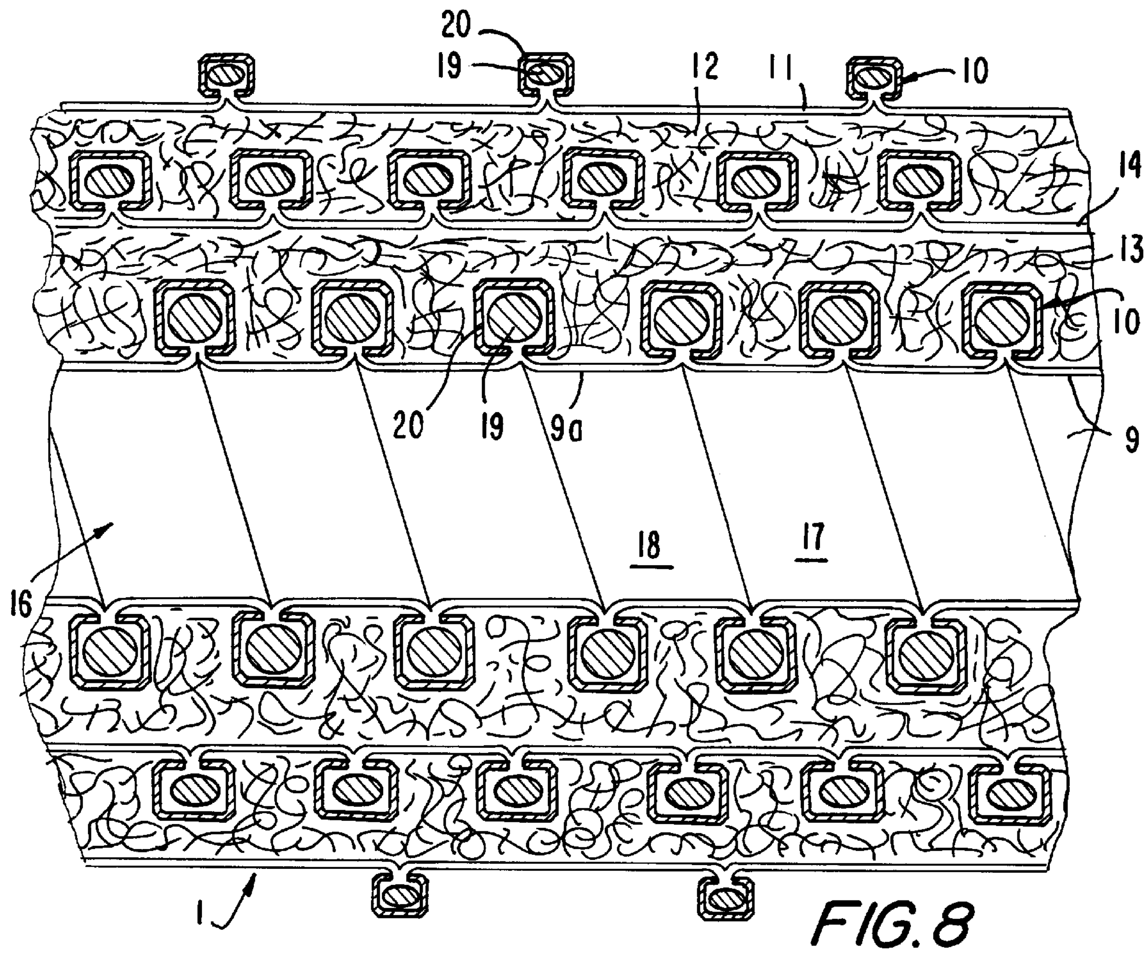
FIG. 8 shows a partial longitudinal section through another embodiment with an intermediate hose inserted between the outer and inner hose.

According to FIGS. 6 to 8, depending upon the temperature of the gas to be guided, the inner hose 9 is comprised of a textile material, a woven cloth made of metal wire, glass fiber, synthetic, natural, or ceramic, a nonwoven, or a soft, thin foil of polyurethane, polyamide, or a combination of these materials, which is held together either by metal rings comprised of individual rings or, according to FIGS. 6 to 8 by a spiral 10 as the metal element, which is comprised of spiral strips. The intermediate layer of material between the inner hose 9 and the outer hose 11 is embodied by a randomly oriented pile either of mineral fibers 12 according to FIGS. 6 and 7 or of stainless steel wool 13 according to FIG. 8.

The outer hose 11 is either embodied as smooth according to FIG. 6 or, according to FIG. 7, provided with the same construction as the inner hose 9. The outer hose 11 can be embodied of a gastight and airtight plastic, such as polytetrafluoroethylene (PTFE), polyamide (PA), polyester (PETP), or of a textile which is uncoated or is coated on one or both sides with these plastics and is made of wire or glass fiber, synthetic, natural, or ceramic woven cloth, of nonwoven, or of a combination of these materials.

The exemplary embodiment according to FIG. 8 is intended particularly for guiding hot gasses with a temperature of 1150° C. and higher as well as for blocking and damping the noise spreading in them. In this exemplary embodiment, an intermediate hose 14 is inserted between the inner hose 9 and the outer hose II. This intermediate hose 14 has the same construction as the inner hose 9. In this instance, the inner hose 9 is comprised of a fine stainless steel wire cloth, while the intermediate hose 14 and the outer hose 11 are comprised of a glass fiber reinforced cloth, however the intermediate layer of material between the intermediate hose 14 and the outer hose 11 is embodied of a randomly oriented pile of mineral fibers 12.

Naturally, the principal construction of the gas guide element according to the invention according to FIGS. 1 to 5 is only intended to be an example. Gas guide elements are also possible which have both fewer than three convolutions and more than three convolutions. The choice is made by one skilled in the art according to the main employment purpose of the gas guide element. If this employment purpose is mainly directed toward reducing the sound intensity which exists at the gas entry 2, more than only three convolutions can easily be used. The number of convolutions, though, is chosen so that not too increased a backpressure to the turbine 8 or to a different engine is produced by the pressure loss which increases with each convolution. For this reason it is advantageous to enlarge, for example to double, the cross-sectional faces of the gas guide conduit 16 of the inner hose 9 in relation to the cross-sectional face of the main conduit 3 upstream of the gas inlet 2.

For further reduction of sound intensity, the inner hose 9 can also be provided with a spray device 15 according to FIG. 2 in order to be able to inject water into the guide conduit 16 of the gas guide element 1, by means of which the thermal stress on the materials is also reduced. A spray device 15 of this kind is provided in FIG. 2 as an annular spray nozzle at the gas inlet 2, but can also be disposed differently and at several points in the guide conduit 16.

Figure 9:
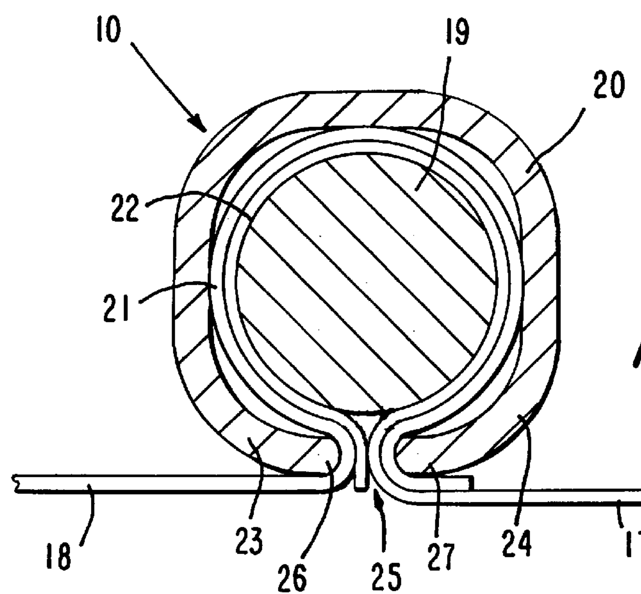
FIG. 9 shows an enlarged cross sectional view of a connection between two spiral-shaped material strips by means of a metallic support body and a metal spiral with a C-shaped cross section.

FIG. 9 shows an enlarged representation of the principal construction of the inner hose 9, the intermediate hose 14 according to FIG. 8, and the outer hose 11 according to FIGS. 7 and 8.

In this instance, the hoses 9, 11, and 14 are comprised of two spiral-shaped material strips 17, 18, a spiral-shaped support body 19, and also a spiral-shaped clamping body 20 with a C-shaped cross section. The overlapping lateral ends 21, 22 of the spiral-shaped material strips 17, 18 enclose the support body 19. The legs 23, 24 of the clamping body 20 are disposed opposite each other at the opening point 25 and at this point clamp the overlapping lateral ends 21, 22 of the material strips 17, 18. The edges 26, 27 of the legs 23, 24 are rounded in order to prevent a tearing of the material strips 17, 18 at this point. The construction in principle of the two material strips 17, 18 in connection with the support body 19 and the clamping body 20 is described in every detail with several variants in German Patent Publication DE 37 20 231 A1 and is therefore not the subject of the current invention.

By placing a plurality of material strips 17, 18 on top of each other, it is possible with these metal elements 19, 20 to clamp them simultaneously, and therefore the combinations of these materials, which are for the inner hose 9 and are claimed in claim 1, are possible. As a result, the inner hose 9 can be embodied alternatively to be gas- and airtight or to be gas- and air-permeable.

Both the clamping body 20 and the support body 19 are comprised of metal and form a mass capable of oscillation, which can oscillate into the randomly oriented pile of mineral fiber wool 12 or stainless steel wool 13 and consequently can correspondingly reduce the sound intensity. The surprising sound intensity reduction with the gas guide element according to the invention appears to rest mainly in the blocking of sound intensity by means of the oscillating masses 19, 20 in connection with the randomly oriented pile of mineral fiberwool 12 and/or stainless steel wool 13. In connection with at least one convolution W with as narrow as possible a convolution radius r the sound penetrating into the guide conduit 16 is reflected by the inner wall 9*a* of the inner hose 9, so that a sound reduction is also possible by means of corresponding interference phenomena. The reduction of experimentally generated sound intensity from 150 dB(A) at the gas inlet 2 to 89 dB(A) at the gas outlet 5 speaks for itself, since this signifies an approximately 20-fold reduction of the original sound intensity.

Naturally, the gas guide element 1 according to the invention can also be used for sound blocking and damping at the inlet 8*a* of this turbine 8.

In order to reduce unwanted impedances on the aspirating side or the exhaust side, which can result in the destruction of the turbine 8 when particular limit values are exceeded, flow accelerators, such as ventilators, flow pumps, etc., which are also muffled, are then advantageously inserted into the flow conduit 16 of the gas guide element 1, and/or the cross-sectional face of the gas guide element 16 is enlarged in relation to the cross-sectional face at the turbine inlet 8*a*.

It will be understood that each of the elements described above, or two or more together, may also find a useful application in other types of constructions differing from the types described above.

While the invention has been illustrated and described as embodied in gas guide element with sound-absorbent walls for blocking and damping noise spreading from it into main conduits, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A gas guide element with sound-absorbent walls for blocking or damping noise spreading into main conduits of a sound emitting machine, the gas guide element comprising a guide element body including a flexible sound absorbent inner hose resistant to mechanical, chemical and caloric load exerted by a gas to be guided; an outer hose; and a soft and flexible sound-absorbent intermediate layer of material disposed between said sound-absorbent inner and outer hose, said inner hose being composed of a flexible material and having an outer side provided with oscillating weighted metal elements which adsorb sound intensity, said sound adsorbent intermediate layer being composed of a randomly oriented pile of material into which said weighted metal elements are introduced, and said guide element body having a gas inlet and a gas outlet and at least one 360° convolution between said gas inlet and said gas outlet.

2. A gas guide element as defined in claim 1, wherein said inner hose is composed of a material selected from the group consisting of a textile material a woven cloth of metal wire glass fiber, a synthetic material, a ceramic material, a non woven material, and a foil which is composed of a material selected from the group consisting of polyurethane, polyamide and polytetrafloroethylene.

3. A gas guide element as defined in claim 1, wherein said outer hose encloses said inner hose, said weighted metal elements being formed as a metal spiral arranged so that an intermediate space between an inner wall of said outer hose and an outer wall of said inner hose is filled with a filler.

4. A gas guide element as defined in claim 3; and further comprising means for connecting one of said hose with said metal spiral, said connecting means including clamps.

5. A gas guide element as defined in claim 3; and further comprising means for connecting one of said hose with said metal spiral, said connecting means including clip-in bands.

6. A gas guide element as defined in claim 1, wherein said intermediate layer is composed of the randomly oriented pile of material selected from the group consisting of mineral fibers, metal fibers, shavings, and chips of entropy-plastic materials.

7. A gas guide element as defined in claim 1, wherein said weighted metal elements are formed as individual rings which enclose said inner hose.

8. A gas guide element as defined in claim 1, wherein said inner hose is composed of hose sections, said weighted metal elements being formed as individual rings which hold together said inner hose composed of said hose sections.

9. A gas guide element as defined in claim 1, wherein said inner hose includes two spiral-shaped material strips having overlapping lateral ends, said weighted metal elements being formed as a metal spiral which holds together said two spiral-shaped material strips at said overlapping lateral ends.

10. A gas guide element as defined in claim 1, wherein said weighted metal elements are formed as metal pieces which are fastened regularly to the outer side of said inner hose.

11. A gas guide element as defined in claim 1, wherein said convolution has a shape selected from the group consisting of a circular spiral shape, an archimedean spiral shape, a hyperbolic spiral shape, a logarithmic spiral shape, an elliptic loop shape, an oval loop shape, a knotted convolution shape, a serpentine shape, and a sinusoidal serpentine shape.

12. A gas guide element as defined in claim 1, wherein said guide element body is provided with three convolutions between said gas inlet and said gas outlet.

13. A gas guide element as defined in claim 1, wherein said convolution is formed as a convolution with a narrow convolution radius.

14. A gas guide element as defined in claim 1, wherein said outer hose and said inner hose have identical constructions.

15. A gas guide element as defined in claim 1, wherein said outer hose is composed of a plastic selected from the group consisting of polytetrafluorethylene, polyamide, and polyester.

16. A gas guide element as defined in claim 1, wherein said intermediate layer and said inner hose have identical constructions.

17. A gas guide element as defined in claim 1, wherein said inner hose is composed if a fine stainless steel wire cloth, said intermediate layer and said outer hose being composed or a glass fiber reinforced cloth; and further comprising an intermediate layer of material arranged between said inner hose and composed of stainless steel wool; and an intermediate layer of material located between said intermediate hose and said outer hose and composed of mineral fiber wool.

18. A gas guide element as defined in claim 1, wherein said inner and outer hose are formed as spiral-shaped material strips having overlapping lateral ends; and further comprising a metallic support body enclosed by said overlapping lateral ends; and a clamping body enclosing said overlapping lateral ends and having a C-shaped cross-section, said clamping body having legs which are located opposite to one another at an opening and clamp said material strips at said overlapping lateral ends.

19. A gas guide element as defined in claim 1; and further comprising a carrier in which said guide element body is disposed and which is movable together with said guide element body.

* * * * *